Nov. 10, 1931.　　　T. BROWN　　　1,830,748
TRACTOR
Filed April 24, 1929　　2 Sheets-Sheet 1

INVENTOR.
Theophilus Brown
BY Edward C. Boff
ATTORNEYS.

Patented Nov. 10, 1931

1,830,748

UNITED STATES PATENT OFFICE

THEOPHILUS BROWN, OF MOLINE, ILLINOIS, ASSIGNOR TO DEERE & COMPANY, OF MOLINE, ILLINOIS, A CORPORATION OF ILLINOIS

TRACTOR

Application filed April 24, 1929. Serial No. 357,687.

This invention relates to tractors, and the object of the invention is the production of a tractor having relatively high clearance, yet whose front end is supported so as to have an effective low pivot point.

The trend in modern farming is towards the use of the tractor as a drawing means for practically all farm operations. Among the many and various uses to which the farm tractor is being put, and for which it must be suitable, is for drawing or propelling cultivating implements. In the cultivation of row crops, such as corn, it is very desirable to be able to cultivate even after the plants have reached a considerable height. Since a tractor must necessarily straddle one or more rows, the amount of clearance underneath the tractor definitely limits the number of times that the crop may be cultivated without the tractor's doing injury to the plants. Hence, a tractor to be suitable for drawing cultivating implements, must have relatively high clearance underneath its body between its supporting wheels.

A common way to support the front end of a tractor is to pivot it in the center of the front wheel axle. The design of a tractor having relatively high clearance necessarily calls for a front wheel axle which is arched. This design brings the pivot point for the front end of the tractor at a relatively high point which introduces certain objectionable characteristics in the action of the tractor. Since the front wheels of a tractor are ordinarily of relatively small diameter, they are prone to follow very closely the unevenness in the topography of the ground. With the front end of the tractor pivoted at a relatively high point, considerably above the axis of the front wheels, each slight rise and fall of one of the front wheels is transmitted to the tractor in an amplified lateral movement thereof, causing the tractor to sway from side to side considerably when moving over uneven ground. This is particularly objectionable when a cultivator in the form of an attachment to the front end of the tractor is being operated. In modern day farming it is essential that the position of a cultivator be under accurate control so that the ground very close to the plants may be cultivated. When using a tractor whose front end will sway from side to side as its front wheels ride over slight knolls or depressions, close cultivation without the danger of uprooting many of the plants is impossible.

The main object of my invention is to eliminate this inherent objectionable characteristic of a tractor having a high clearance. I have provided a mounting for the front end of the tractor which, while not interfering with the high clearance thereof, gives the effect of a low pivot point so that the rise and fall of the front wheels does not cause any appreciable side swaying of the tractor. According to my invention I support the front end of the tractor on the arched axle at two points on surfaces the curvature of which coincides with that of a circle the center of which is at some lower point outside of the body of the axle and preferably approximately in a plane through the axis of the front wheels. This center thus becomes in effect, the pivot point of the front end of the tractor. I have therefore provided a tractor having high clearance and yet having an effective low pivot point and hence one having all the advantages of a tractor with high clearance and yet having the operating characteristics of a tractor whose front end has a relatively low pivot point.

In order to acquaint those skilled in the art with the construction and operation of my invention, I have disclosed in the following specification and with the aid of the accompanying drawings one specific embodiment of my invention.

In the drawings—

Figure 1:
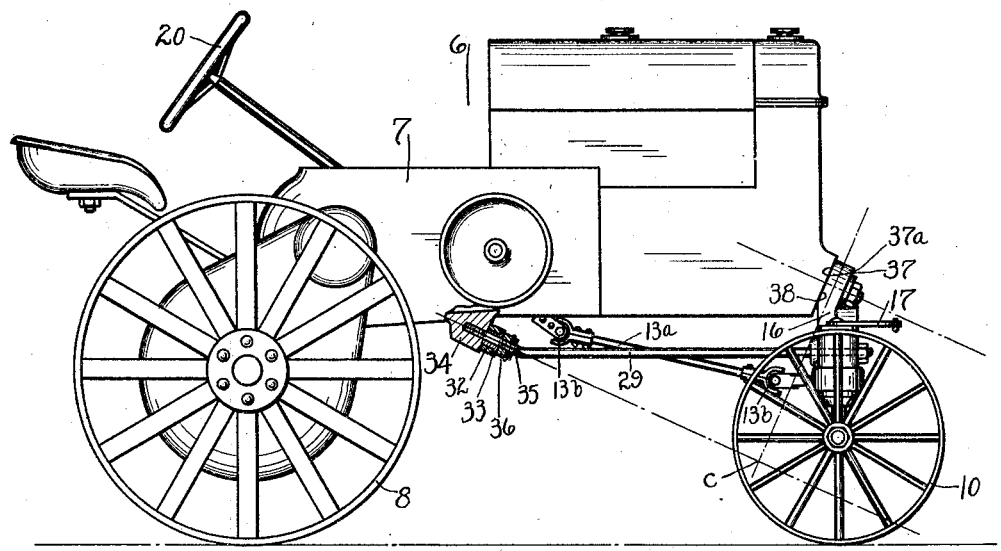
Figure 1 is a side elevation of a tractor modified in accordance with my invention. Those parts with which my invention is not concerned have been shown more or less diagrammatically.
Figure 2:
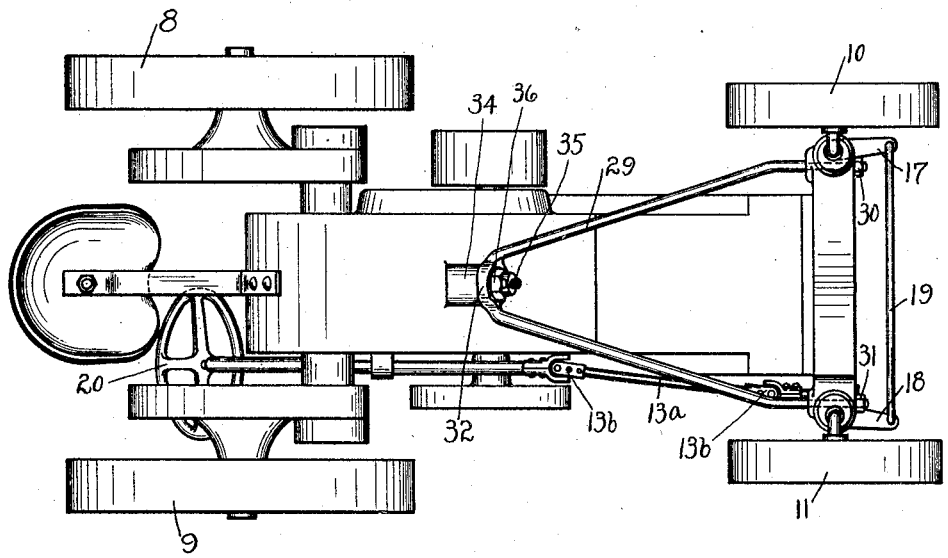
Figure 2 is a bottom view of the tractor.
Figure 3:
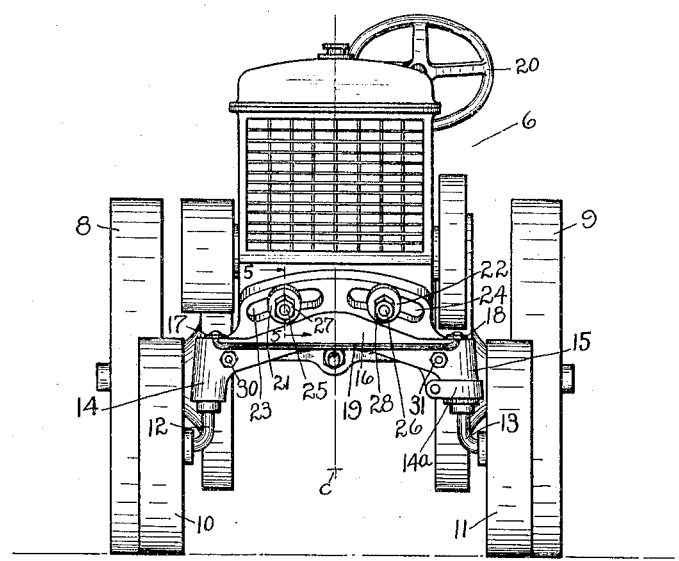
Figure 3 is a front view of the tractor shown standing on level ground.

In the drawings—6 indicates the tractor in its entirety. The tractor in general is assumed to be of well known design comprising a body 7 in which the motor and transmission are housed, and which is supported on rear driving wheels 8—9 and front steering wheels 10—11 relatively high above the ground. The front wheels 10 and 11 are of relatively small diameter and are rotatably mounted on horizontal arms of vertical spindles 12 and 13, which spindles are journaled in vertical bearings 14 and 15 in the two depending arms of an arched front wheel axle 16. Spindles 12 and 13 have fixed thereto horizontally and forwardly projecting arms 17 and 18, respectively, which are connected by a transverse drag link 19 in the usual manner. Steering of the front wheels 10 and 11 is controlled by a steering wheel 20 which is suitably connected with the vertical spindle 13 through the steering link 13a and universal joints 13b for imparting rotary motion thereto in either one or the other direction. A steering worm to which the lower universal joint 13b is connected meshes with a gear fixed on spindle 13 and housed within the housing 14a. Since the invention is not concerned with any particular steering system, the connecting means have not been shown in detail.

Figure 5:
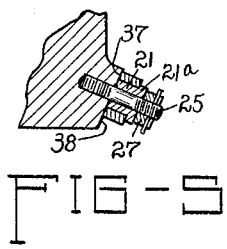
Figure 5 is a fragmentary cross-sectional view along the line 5—5 of Fig. 3.

The front end of the tractor is supported on the arched axle 16 on two downwardly and forwardly inclined rollers 21 and 22 which play in slots 23 and 24, respectively, in the upper portion of the arched axle, the supporting surfaces of which are correspondingly inclined. Slots 23 and 24 are cut on an arc of a circle whose center is at "c", this center being outside of the body of the axle, and preferably substantially in a horizontal plane through the axis of the front wheels 10 and 11. Rollers 21 and 22 are journaled on short shafts 25 and 26, respectively, which shafts are rigidly mounted on the body of the tractor as by threading into the frame thereof as shown in Fig. 5. Rollers 21 and 22 are suitably held in position on shafts 25 and 26 by means of crown nuts 27 and 28 threaded on the end of shafts 25 and 26, respectively.

The front and rear faces 37a and 37, respectively, of the upper portion of arched axle 16 are made parallel and inclined downwardly and rearwardly, perpendicularly to the inclination of rollers 21 and 22, and the surface 38 on the frame of the tractor against which face 37 of the arched axle bears is inclined correspondingly. A flange 21a and 22a on the rollers 21 and 22, holds the arched axle in position against the bearing surface 38.

Forward motion is imparted to the front steering wheels and the axle 16 through a wishbone 29 the two outwardly extending ends of which are fastened to the depending arms of the arched axle 16 as by nuts 30 and 31. The center portion of the wishbone 29 has an enlarged portion 32 through which a longitudinal downwardly and forwardly inclined boring is provided by which it is journaled on a bearing 33. Bearing 33 is rigidly secured to a downwardly projecting boss 34 on the underside of the tractor by means of a bolt 35 and crown nut 36. The axis of the bearing 33 is inclined downwardly and forwardly, parallel to the inclination of rollers 21 and 22, and intersecting the point "c" which is the effective pivot point of the front end of the tractor. With this arrangement it is evident that the front wheels 10 and 11 and arched axle 16 are free to rotate within the limits of the slots 23 and 24 about the axis of the bearing 33.

Figure 4:
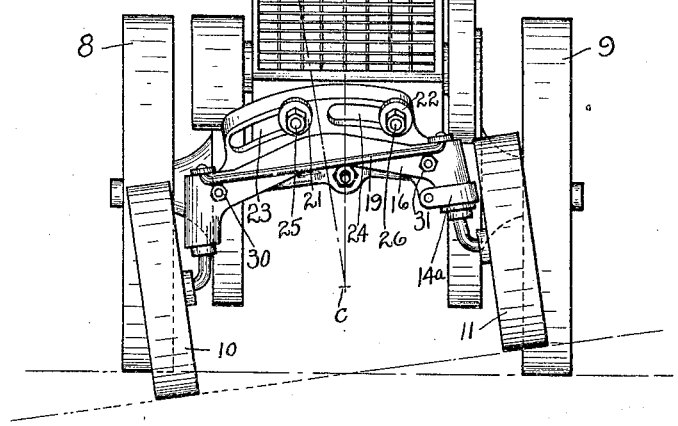
Figure 4 is a front view of the tractor showing the position the front axle takes when its front wheels pass over uneven ground.

As the tractor passes over uneven ground and the front wheels rise and fall, very little or no lateral movement of the front end of the tractor is caused thereby, as is demonstrated in Fig. 4, since the upper part of the front axle is free to move laterally without its having to carry the front end of the tractor with it. If the front of the tractor were pivoted directly to the center of the front arched axle 16, by a single pivot at a point between the two slots 23 and 24, the front end of the tractor upon encountering a ground condition as represented in Fig. 4, would be thrown to the left equal to the distance between lines $x$ and $y$, line $x$ being drawn through the center of the body of the tractor, and line $y$, through the center of the axle 16. With my arrangement, however, since the front wheel axle is free to rotate about an axis which is substantially in a plane containing the axis of the front wheels, practically no lateral movement is transmitted to the body of the tractor. The tractor therefore remains relatively steady even when passing over uneven ground.

The tractor of my invention therefore meets both of the most important requirements for cultivating purposes. It has relatively high clearance beneath its body between its supporting wheels and it is very stable, in that the front wheels in passing over uneven ground even though the front end of the tractor has a high support, do not cause side swaying of the tractor.

While I have shown one specific embodiment of my invention, I do not wish to be limited to the precise arrangement shown. Many modifications will suggest themselves to those skilled in the art particularly in the mechanical design and arrangement of parts, all of which, however, will involve the principle of the invention. Furthermore, my invention may also be applied to any vehicle wherein it is desirable to prevent lateral sway, and is therefore not limited to tractors.

What I consider new and desire to have protected by Letters Patent are all such structures and modifications thereof as come within the scope of the appended claims:

1. A tractor having a pair of front wheels, an arched axle carrying said wheels, and upon which the body of the tractor is supported, the points of support being above the axis of said wheels, and adapted to cause rotation of said axle with respect to the body of the tractor about a downwardly and forwardly inclined axis.

2. A tractor having a pair of front wheels, an arched axle carrying said wheels, the points of support being above the axis of said wheels, a wishbone for transmitting motion to said wheels pivoted to the body of the tractor on a downwardly and forwardly inclined axis, and connections between the body of the tractor and said axle for causing said axle to rotate with respect to the body of the tractor about said downwardly and forwardly inclined axis whenever said front wheels pass over uneven ground.

3. In a tractor, the combination with a tractor body having a downwardly and rearwardly inclined surface on its front end and a pair of rollers mounted on said surface for rotation on axes perpendicular to said inclined surface, of a front wheel axle having an inclined surface bearing against said first inclined surface and having arcuate slots in which said rollers move, a wishbone having arms connected to said axle to transmit thrust thereto and having its center portion journaled to the underside of the tractor body on an axis which intersects the center of curvature of said slots.

4. In a tractor, the combination with a tractor body having a downwardly and rearwardly inclined surface on its front end and a pair of rollers mounted on said surfaces to rotate on axes perpendicular to said inclined surfaces, of a front wheel axle arched in the center and having an inclined surface on its center portion bearing against said first inclined surface and having arcuate slots in which said rollers move, said slots having a common center of curvature which lies outside the body of said axle, a wishbone having arms connected to opposite sides of said axle to transmit thrust thereto and having its center portion journaled to the underside of the tractor body on an axis which intersects the center of curvature of said slots and which is perpendicular to plane of said surfaces.

5. A tractor having a supporting axle connected to the tractor body for rotation with respect thereto about an axis outside of the body of said axle and a wishbone having arms connected to said axle to transmit thrust thereto and having its center portion journaled to the underside of the tractor body.

6. A tractor having a supporting axle connected to the tractor body for rotation with respect thereto about a downwardly and forwardly inclined axis outside of the body of said axle and a wishbone having arms connected to said axle to transmit thrust thereto and having its center portion journaled to the underside of the tractor body on an axis coincident with said downwardly and forwardly inclined axis.

7. A vehicle having a body member and a wheel supported axle member connected thereto through connections including a pair of rollers journaled on one of said members on inclined axes and an arcuate bearing surface on the other member engaging said rollers.

8. A vehicle having a wheel supported axle connected to the body of the vehicle for rotation with respect thereto about a downwardly and forwardly inclined axis, said axis piercing the plane of said axle at a point below the point of connection of the axle to the body of the vehicle.

In witness whereof, I hereunto subscribe my name this fifteenth day of April, 1929.

THEOPHILUS BROWN.